United States Patent
Bernegger et al.

(10) Patent No.: US 12,129,528 B2
(45) Date of Patent: Oct. 29, 2024

(54) METHOD AND INDUSTRIAL PLANT FOR SEPERATING A WASTE MATERIAL

(71) Applicants: Bernegger GmbH, Molln (AT); Hatch Küttner GmbH, Essen (DE)

(72) Inventors: Kurt Bernegger, Leonstein (AT); Bernhard Hanusch, Hagen am Teutoburger (DE); Dirk Behrmann, Essen (DE); Farzad Salehi, Essen (DE); Thomas Breuer, Kaarst (DE)

(73) Assignees: Bernegger GmbH, Mollon (AT); Hatch Küttner GmbH, Essen (DE)

( * ) Notice: Subject to any disclaimer, the term of this patent is extended or adjusted under 35 U.S.C. 154(b) by 60 days.

(21) Appl. No.: 17/924,889

(22) PCT Filed: May 14, 2021

(86) PCT No.: PCT/EP2021/062813
§ 371 (c)(1),
(2) Date: Nov. 11, 2022

(87) PCT Pub. No.: WO2021/229047
PCT Pub. Date: Nov. 18, 2021

(65) Prior Publication Data
US 2023/0193421 A1    Jun. 22, 2023

(30) Foreign Application Priority Data
May 14, 2020   (DE) .................... 10 2020 206 095.9

(51) Int. Cl.
*C22B 9/16*     (2006.01)
*C10L 5/04*     (2006.01)
(Continued)

(52) U.S. Cl.
CPC .................. *C22B 9/16* (2013.01); *C10L 5/04* (2013.01); *C10L 5/08* (2013.01); *C22B 1/24* (2013.01);
(Continued)

(58) Field of Classification Search
CPC ... C22B 1/24; C22B 15/0054; C22B 15/0056; C22B 9/16; C10L 2200/0204;
(Continued)

(56) References Cited

FOREIGN PATENT DOCUMENTS

DE    102008038966 B3    8/2009
DE    102015011067 A1    4/2017
(Continued)

OTHER PUBLICATIONS

Thomas Scientific, London, GB; AN 2001-232624 XP002803714, & JP 2001 049357 A (Kiryu Kikai KK) Feb. 20, 2001 )Feb. 20, 2001 Zusammenfassung Apr.
(Continued)

*Primary Examiner* — Latosha Hines
(74) *Attorney, Agent, or Firm* — FisherBroyles, LLP

(57) ABSTRACT

A method and an industrial plant for separating a waste material comprises at least one metal and at least one organic material. A separated fraction of the waste material is provisioned which is isolated from the waste material in the course of a mechanical preparation operation. The separated fraction comprises briquettes produced from the waste material, and optionally a coarse fraction of the waste material or of another waste material. A reactor is charged with the separated fraction and gas containing oxygen is introduced into the reactor and the separated fraction is combusted in an incomplete combustion process. The separated fraction is
(Continued)

melted into a liquid slag phase and into a liquid metal-containing phase. The slag phase and/or the metal-containing phase are poured off from the reactor.

20 Claims, 3 Drawing Sheets

(51) Int. Cl.
  *C10L 5/08* (2006.01)
  *C22B 1/24* (2006.01)
  *C22B 15/00* (2006.01)
(52) U.S. Cl.
  CPC ...... *C22B 15/0054* (2013.01); *C22B 15/0056* (2013.01); *C10L 2200/0209* (2013.01); *C10L 2200/0469* (2013.01)
(58) Field of Classification Search
  CPC ..... C10L 2200/0209; C10L 2200/0469; C10L 2230/08; C10L 2290/02; C10L 2290/24; C10L 2290/28; C10L 2290/30; C10L 2290/52; C10L 5/04; C10L 5/08; C10L 5/361; C10L 5/40; C10L 5/44; C10L 5/46; C10L 5/48
  See application file for complete search history.

(56) References Cited

FOREIGN PATENT DOCUMENTS

| EP | 0246388 A1 | 11/1987 | |
|---|---|---|---|
| EP | 3026126 A1 * | 6/2016 | ............... C21B 3/06 |
| JP | 2001049357 A | 2/2001 | |
| WO | 2012019216 A1 | 2/2012 | |

OTHER PUBLICATIONS

International European Patent Office PCT/EP2021/062813, dated Aug. 2, 2021.

Thomas Scientific, London, GB;, vol. 2005, No. 12, AN 2005-108888, Retrieved from: Databasse WPI [online] KP002803687 & KR 20040084155 A (Univ Hoseo Academic Coop Found) Oct. 6, 2004 (2004-10-06) abstract; claims 1,2; examples 1-4.

Naruset et al. "Application of waste plastics to electric furnace for steel making as thermal and carbon sources", Sep. 29, 2004 (Sep. 29, 2004), pp. 145-154, Waste Management in Japan Waste Management in Japan; Second International Conference on Waste Management and the Environment Held in Rhodes, Greece From Sep. 29-Oct. 1, 2004, Witpress, GB, Retrieved from the Internet: https://ww.witpress.com/elibrary/wit-transactions-on-ecology-and-the-environment/79/1446.XP009528710 paragraph.

Thomas Scientific, London, GB; , vol. 2006, No. 61, AN 2006-594598, Retrieved from; Database WPI [online] XP002803688.

* cited by examiner

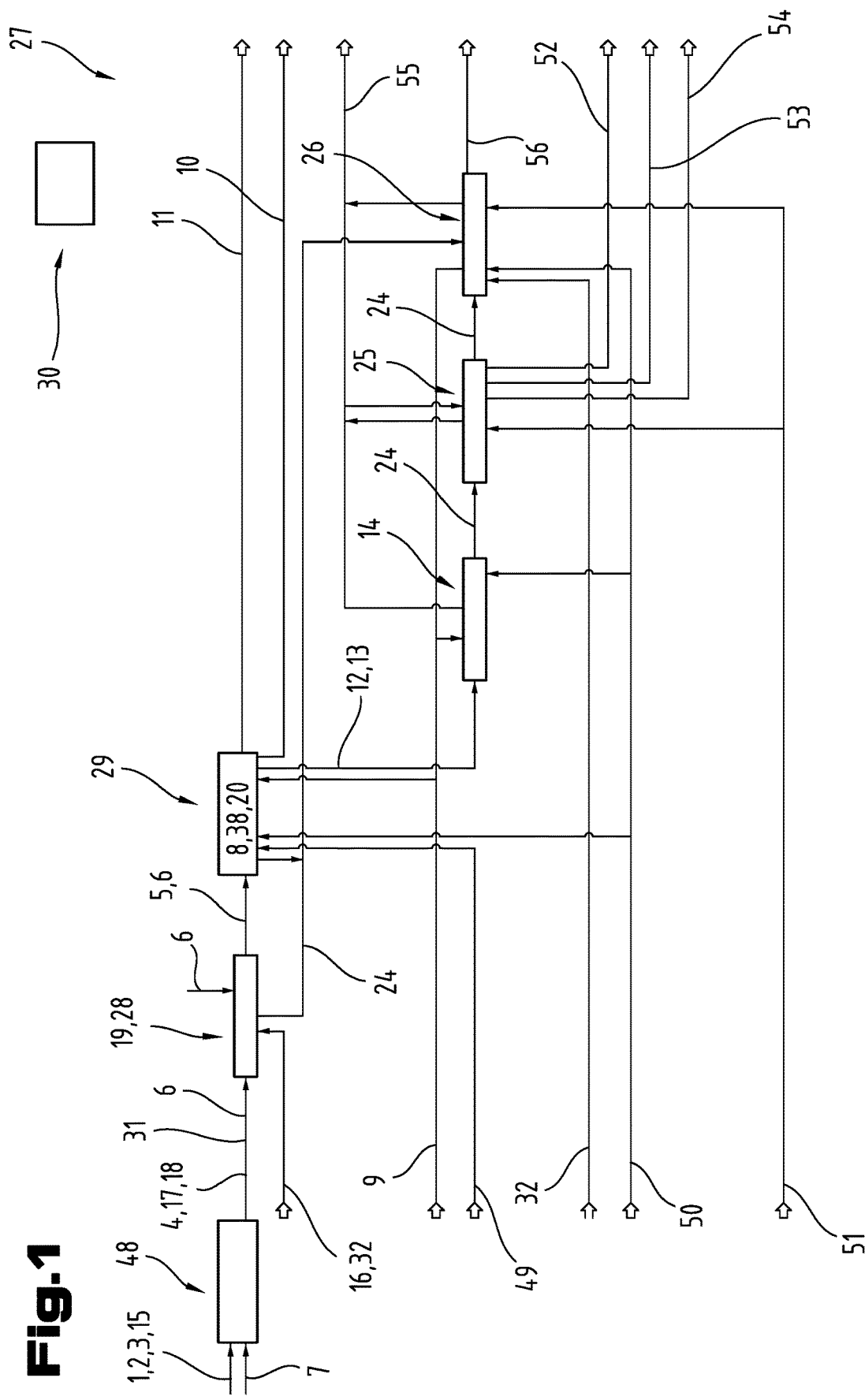

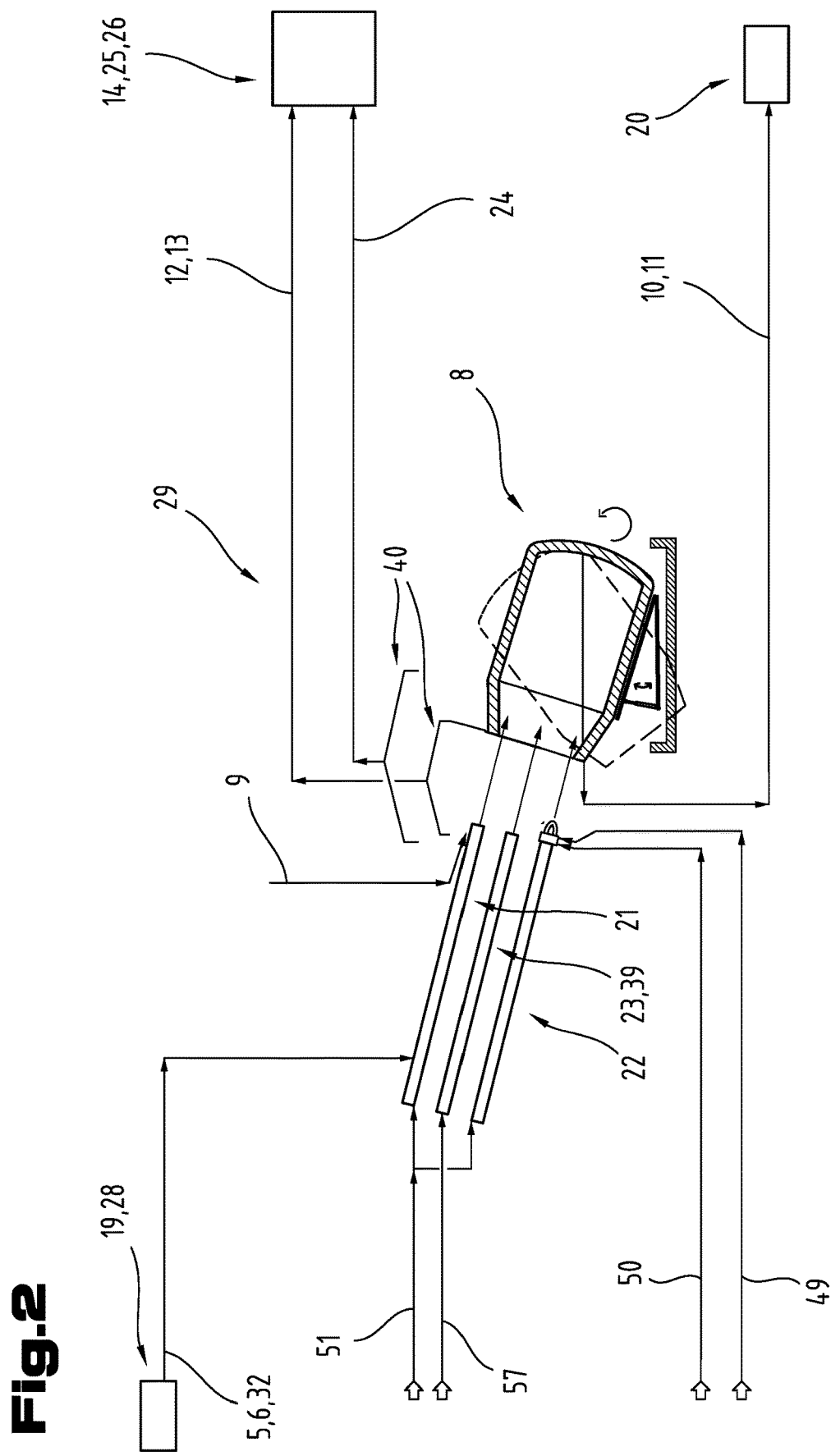

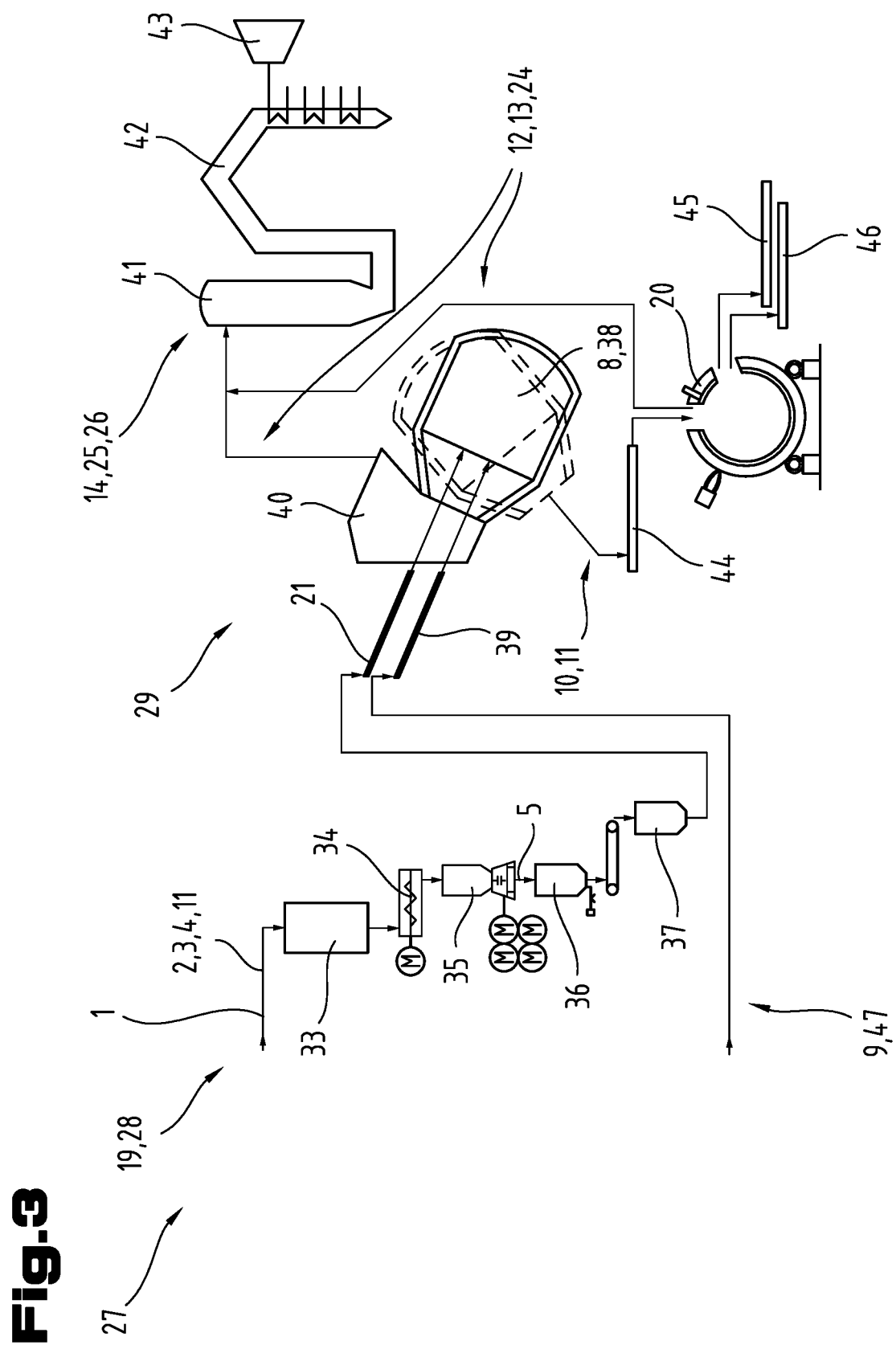

METHOD AND INDUSTRIAL PLANT FOR SEPERATING A WASTE MATERIAL

CROSS-REFERENCE TO RELATED APPLICATIONS

This application is a National Stage Patent Application of International Patent Application No. PCT/EP2021/062813, filed May 14, 2021, which claims the benefit of German Application Ser. No. 10, 2020, 206,095.9, filed May 14, 2020, the contents of each are incorporated by reference in their entireties.

TECHNICAL FIELD

The disclosure relates to a method for separating a waste material as well as to an industrial plant for carrying out such a method.

BACKGROUND

Waste materials of different kinds can be mechanically prepared and divided into reusable and/or recyclable fractions, for example in shredder plants. The fractions thus produced, namely the shredder light fraction (SLF) and the shredder heavy fraction (SHF) can be separated into fluxes of recyclables, which are subsequently prepared and therefore fed back into a recycling loop in the course of preparation processes.

However, there will always remain residues from the SLF and SHF which have a relatively low content of reusable material, in particular with a low metal content. Preparation processes for preparing these shredder residues are known to those working in the field. However, these methods are only slightly satisfactory from an economic perspective. This is in particular also true because the quality and contents of the composition of the shredder residues vary greatly. For this reason, shredder residues, most of the time, are either combusted in a thermal recovery plant (TVA) or deposited.

So far, especially shredder light fractions as an example of residues from shredder plants which contain heavy metals or other waste material having a high content of organic and mineral ingredients and a low content of metal ingredients are disposed of in the construction of waste disposal sites, as backfilling material or in waste incineration plants. However, it is not possible to recover and reuse sometimes valuable ingredients of this waste in this manner.

These solutions are not, however, in accordance with an economically sustainable system and therefore only partially satisfactory, all the more as, when incinerated and deposited, metals, which must otherwise be mined by effortful primary extraction, will be permanently lost for re-feeding into a recycling loop.

In order to be able to reuse raw materials contained in such waste material in part or, where possible, in full, it is necessary to selectively segregate these raw materials from the waste material in as pure a condition as possible, which particularly applies to heavy metals, in particular noble metals, in order to re-feed the raw materials into the materials cycles. The disposal methods used so far, in particular waste incineration plants, are unsuitable for this task. Due to its structure, the result of waste incineration does not enable separation of its ingredients.

While methods for recovering metals from primary and also secondary sources of raw materials in metallurgical plants are generally known, the known methods do not enable processing waste fractions with large input fluxes and relatively low metal contents in an ecologically and economically satisfactory manner. This applies in particular whenever the small quantities of contained metal and/or metals are fine material. In particular small-grain, strongly intergrown residues with a low metal content, e.g. from preparing shredder residues from preparing used electric or electronic appliances (so-called tertiary waste, i.e. waste which forms the residue and/or remainder which remains after a multi-stage preparation operation), can currently not be recovered in a satisfactory manner.

OVERVIEW

It was the object of the present disclosure to overcome the disadvantages of the prior art and to make available a method and an industrial plant for separating waste material which enable an ecological preparation and, further, an economic recovery of reusable materials.

This object is achieved by means of a method and by means of an industrial plant in accordance with the claims.

The disclosure relates to a method for separating a waste material. The waste material comprises at least one metal and at least one organic material. The waste material may be residues from a mechanical preparation operation which contain at least one metal, for example residues from preparing electric and electronic scrap or shredder residues. The organic material may be, for example, any kind of plastics, any non-compostable organic material, but also any kind of cellulose-containing materials such as wood, or also natural fibers. The organic material may also be, for example, epoxy resin, which can be a component of electronic scrap.

In accordance with the method, a separated fraction of the waste material is provisioned, which separated fraction is isolated from the waste material in the course of a mechanical preparation operation and which comprises the at least one metal and the at least one organic material. The mechanical preparation can be a single or multi-stage operation and comprise, for example, a preparation operation in a shredder plant or in a plant downstream of the shredder plant. The separated fraction comprises briquettes essentially produced from the waste material and, optionally, a coarse fraction of the waste material or a coarse fraction of another waste material. Preferably, the briquettes and/or the material used for briquetting can be composed predominantly of small-grain material. As it is well-known to those working in the field that the term "briquette" refers to moldings compacted from small-grain material, a detailed definition will not be presented in this context. The coarse fraction can originate from the same waste material as the briquettes. Yet it is also conceivable that the coarse fraction is a fraction of a different waste material, for example a coarse fraction from preparing electric and electronic scrap, used metal, plastic waste or motor vehicles. In this context, the term "coarse material" refers to a material which is coarse in comparison with a briquettable fine material and which cannot, or not easily, be briquetted. Advantageously, the coarse fraction can have a high content of reusable materials in comparison with the briquettes, in particular a high content of iron as well as of non-ferrous heavy metals and noble metals, so that the separation process becomes more economical through the addition of a certain quantity of coarse fraction. It may be expedient in this context if the metal content, in particular the copper content, and/or the calorific value of the briquettes as well as of the coarse fraction are known. These parameters, among others, can be measured and/or checked at suitable, continuous or discontinuous, intervals. Such an ongoing quality control can be done, for example, with the help of a central control, regulation and measurement system.

The separated fraction has a calorific value of 5 MJ/kg to 30 MJ/kg and a maximum copper content of 0.1 wt % to 20 wt %. Also a quality control of the separated fraction can take place, for example with the help of a control, regulation and measurement system. If at least the parameters "calorific value" and "copper content" of the briquettes and of the coarse fraction are known, the separated fraction can be prepared and/or melted in a particularly precise and efficient manner in a reactor plant and/or in a reactor, in particular in a melting reactor.

In another process step, a reactor is, continuously or discontinuously, charged with the separated fraction. Furthermore, gas containing oxygen, i.e. combustion air, is introduced into the reactor as an oxidant and the separated fraction is oxidized and/or incinerated in an incomplete combustion process, wherein the reaction and/or the melting ideally take place autothermally and without additional fuels. Due to the high calorific value of the separated fraction, a process control with an incomplete combustion and/or oxidation is of importance, so that the reactor is protected against overheating and/or against a thermal collapse and associated damage.

The separated fraction is melted into at least one liquid slag phase and into at least one liquid metal-containing phase using the thermal energy generated during the combustion of the separated fraction. Initially, this results in an emulsion-like mixture of the phases and/or a so-called mixed phase. It has become apparent that an incomplete combustion is sufficient for melting the separated fraction. In the course of the melting process, the separated fraction can be melted at a temperature of about 1220° C. to 1250° C.

The at least one slag phase and/or the at least one metal-containing phase are poured off from the reactor. This can take place either separately by initially separating the at least one slag phase, for example after a certain duration of time which is required for a gravimetric phase separation, and subsequently isolating the at least one metal-containing phase. Yet it may also be the case that the phases are collectively, i.e. as a mixed phase, removed from the reactor and transferred to a separation furnace for the purpose of gravimetric separation.

In another method step, at least one portion of an incompletely combusted flue gas is conducted out of the reactor and the at least one portion of the incompletely combusted flue gas is conducted into a thermal post-combustion plant and the at least one portion of the incompletely combusted flue gas is post-combusted. Essentially, the thermal post-combustion plant can comprise a post-combustion boiler with one or multiple sub-sections. This pyrometallurgical process can take place in a cyclical manner, wherein a batch period is about the same duration as a melting cycle in the reactor. This kind of process control results in an equally cyclical quantity of heat from the reactor which must be compensated for by adding secondary or substitute fuels to the post-combustion boiler in order to be able to ensure a stable operation of any waste heat recovery plant subsequent to the thermal post-combustion plant.

The method has the advantage that large fluxes of material with a relatively low content of reusable materials, in particular with a low copper content, can be prepared in an ecological manner and the copper content can be recovered in an economical manner at the same time. This is enabled, among other things, by the process control in accordance with the invention and the precisely adjusted calorific value and copper content of the separated fraction.

It should be mentioned in this context that the individual method steps and their chronological sequence need not necessarily take place in the specified order, but also a different chronological sequence is possible. Possibly, however, the specified method steps could take place in a successive, and therefore sequential, chronological sequence.

Essentially, this method is used to extract three main fluxes of recyclables from the separated fraction used and/or from the waste material. These are: at least one liquid metal-containing phase and/or a metal alloy, at least one liquid slag phase as well as a recoverable waste heat. The metal alloy can subsequently be prepared into a valuable metal, up to pure copper. The slag phase can equally be prepared and—in particular if its quality was enhanced by adding additives—be granulated and be used, for example, as a latent hydraulic binder in concrete. Alternatively, the slag phase may also be used in road construction or as a sandblasting agent. It is also conceivable to deposit the slag phase as low-level waste because, according to the method, the slag phase is, at least essentially, free from hazardous substances and free from recyclables. The waste heat generated during the method can, for example, be converted into electricity by means of a waste heat recovery plant and supplied to a local and/or remote district heating distribution network.

Furthermore, it may be expedient if the waste material comprises at least one mineral material and/or that a mineral slag former is added to the separated fraction. The existence of mineral material in the waste material and/or in the separated fraction as well as the adding of additional mineral slag formers as additives can facilitate the formation of a slag phase with suitable viscosity and therefore have a positive influence on an isolation operation from a metal phase. The additives can be added both to the separated fraction or also directly into the reactor when charging the reactor.

It may further be provided that the separated fraction is provisioned with a calorific value of 8 MJ/kg to 25 MJ/kg, preferably of 11 MJ/kg to 18 MJ/kg. This calorific value has proven particularly expedient for a precise and efficient process control.

It may furthermore be provided that the separated fraction is provisioned with a maximum copper content of 0.3 wt % to 10 wt %, in particular of 0.5 wt % to 3 wt %. This copper content has proven particularly expedient for a precise and efficient process control.

Also advantageous is an embodiment in accordance with which it may be provided that the briquettes are provisioned with a calorific value of 5 MJ/kg to 30 MJ/kg, preferably of 8 MJ/kg to 25 MJ/kg, particularly preferably of 11 MJ/kg to 18 MJ/kg. This calorific value has proven particularly expedient for a precise and efficient process control. In particular if both the calorific value of the separated fraction and the calorific value of the briquettes themselves are known and/or adjusted precisely, this may have a significant positive influence on the process control.

In accordance with one advancement, it is possible for the briquettes to be provisioned comprising a fine fraction and/or a lint fraction. Advantageously, in particular small-sized fluxes of material are used for the processing into briquettes. This subsequently enables both the precise adjustment of the calorific value and of the copper content and, further, facilitates the charging of the reactor.

The fine fraction can have, predominantly, components with a maximum grain size of less than 15 mm, preferably of less than 10 mm. The term "fine fraction" is known in the mechanical preparation of waste material and refers to a fraction of sand and fine material produced in the course of a single or multi-stage mechanical waste preparation operation. The fine fraction is therefore, most of the time, a mixture of, for example, glass, small-grain iron, thin copper cables, lead and zinc-containing dusts, plastic particles, lint as well as lacquer residues. The fine fraction is usually relatively light-weight and therefore requires large amounts of space for storage and transport. Usually, the calorific value of the fine fraction is in the range of 5 MJ/kg+/−5 MJ/kg. Further, the fine fraction can comprise a high content of oxidic materials, which may serve as slag formers in any subsequent melting process. The fine fraction can have an iron content of up to 20 wt %. Further, the fine fraction can have a content of non-ferrous metals (e.g. copper, zinc, gold etc.) of up to 5 wt %. In accordance with the classification of the Austrian List of Wastes Ordinance and/or in accordance with item 5 of table 1 of the ÖNORM S 2100 "List of Wastes," the fine fraction falls among code number SN 91103 for residues from mechanical preparation. This classification analogously applies to this kind of material also outside of Austria and even if the material is not classified as waste material.

The term "lint fraction" or "lint" is known in the mechanical preparation of waste material and refers to a mixture of light-weight, porous and/or fibrous raw materials (textile fibers, foams, wood and/or cellulose, foils . . . ) produced in the course of a single or multi-stage mechanical waste preparation operation. Usually, the calorific value of the lint fraction is in the range of 22.5 MJ/kg+/−10 MJ/kg and is therefore considerably higher than the calorific value of the fine fraction most of the time. It may also be the case that the lint fraction contains compounds of lead, zinc and/or chlorine. The lint fraction can have an iron content of up to 6%. Further, the plastic fraction can have a content of non-ferrous metals (e.g. copper, zinc, gold etc.) of up to 5 wt %. In accordance with the classification of the Austrian List of Wastes Ordinance and/or in accordance with item 5 of table 1 of the ÖNORM S 2100 "List of Wastes," the fine fraction falls among code number SN 91103 for residues from mechanical preparation. This classification analogously applies to this kind of material also outside of Austria and even if the material is not classified as waste material.

Yet it may also be the case that a plastic fraction is added to the separated fraction, in particular to the briquettes, wherein the plastic fraction may be, for example, a fraction from a shredder plant. Usually, a plastic fraction comprises solid and lumpy material and/or rounded fragments from a mechanical preparation operation of waste material according to the method. Usually, the calorific value of the plastic fraction is in the range of 18.5 MJ/kg+/−10 MJ/kg. It may also be the case that the plastic fraction contains a high content of chlorine compounds. The plastic fraction can have an iron content of up to 5 wt %. Further, the plastic fraction can have a content of non-ferrous metals (e.g. copper, zinc, gold etc.) of up to 5 wt %. The use of a plastic fraction as a second fraction can facilitate and render more flexible an adjustment of the calorific value of the briquette mixture. Depending on its properties and/or on its degree of lumpiness or fineness, a plastic fraction can also be added to the separated fraction as a coarse fraction.

It may further be expedient if the gas is air, in particular ambient air. Yet it may also be in accordance with an efficient process control that the gas is oxygen-enriched air and/or ambient air.

It may furthermore be provided that a, preferably continuous, measurement of the oxygen content, of the composition and/or of the temperature of the at least one portion of the incompletely combusted flue gas takes place and that a proportion of a charging quantity of briquettes and/or of a charging quantity of coarse fraction to a quantity of the gas is controlled on the basis of the measurement. This has the advantage that a particularly precise and efficient process control is enabled. The measurement of parameters and the control can take place, for example, by means of a central control.

Furthermore, it may be provided that a, preferably continuous, measurement of the oxygen content, of the composition and/or of the temperature of the at least one portion of the incompletely combusted flue gas takes place and that the calorific value of the briquettes in an upstream briquetting plant is controlled on the basis of the measurement. This has the advantage that a particularly precise and efficient process control is enabled. The measurement of parameters and the control can take place, for example, by means of a central control.

In accordance with a particular embodiment, it is possible that the at least one metal-containing phase is, at least essentially, a copper-iron alloy. What is meant by this is that the copper-iron alloy accounts for more than 50 wt % of the at least one metal-containing phase. Preferably, the copper-iron alloy accounts for more than 90 wt % of the at least one metal-containing phase. The production of a copper precursor instead of a pure-copper product has the advantage that the melting and separation process can take place efficiently and relatively quickly. Additional process steps, which could limit and/or slow down the method, can therefore subsequently be dealt with further in a preparation plant specifically designed to prepare a copper-iron alloy.

According to an advantageous advancement, it may be provided that the at least one slag phase and the at least one metal-containing phase are placed from the reactor into a separation furnace jointly, i.e. at least essentially in the form of a mixed phase, in which separation furnace a gravimetric separation of the at least one slag phase and of the at least one metal-containing phase takes place, and that the pouring-off of the at least one slag phase and of the at least one metal-containing phase from the separation furnace takes place separately. Having the separation of the mixed phases take place in a separate part of the plant and/or in a separate container enables the reactor to be re-charged after evacuation. The plant and energy efficiency as well as the degree of utilization can therefore be increased.

In particular, it may be advantageous if the pouring-off of the at least one slag phase takes place more frequently than the pouring-off of the at least one metal-containing phase. This is in particular advantageous because the separated fraction has merely low contents of reusable materials and/or metal and relatively high contents of slag.

It may further be provided that the reactor is charged with the briquettes, with the coarse fraction and with the gas by means of a charging lance and that the charging lance has a diameter which corresponds to two to five-fold the diameter, preferably at least triple the diameter, of the maximum diameter of the separated fraction. This has the advantage that a charging of the reactor can take place in a manner that is controlled, simple and almost unsusceptible to failure.

It may furthermore be provided that a natural gas-oxygen burner lance is provisioned, which protrudes into the reactor and/or into the mixed phase and which is preferably used for firing the reactor during a start-up process, i.e. for example during an initial start-up and/or during start-up of the plant after a standstill and/or after a cooling-down. Further, the natural gas-oxygen burner lance can also be used in order to avoid and/or compensate for a cooling-down of the reactor between batches.

Also advantageous is an embodiment in accordance with which it may be provided that a metallurgical consumption lance is provisioned, which protrudes into the reactor and which is used for injecting gas containing oxygen into the reactor, wherein the gas is either top-blown directly onto the separated fraction or wherein the consumption lance is immersed in the separated fraction. A metallurgical consumption lance can therefore be used to introduce compressed air into the reactor as and when needed, wherein the consumption lance can both top-blow directly onto the surface of the separated fraction melted into a slag phase and into a metal-containing phase and be immersed into the two phases. The top-blowing of compressed air onto the liquefied surface homogenizes the liquefied surface and has a positive influence on the decomposition of the briquettes. When immersing the consumption lance into the two phases, the iron contained in the metal-containing phase is partially oxidized. This can prevent too high a content of metal iron in the metal-containing phase from increasing, in an undesired manner, the melting point of the metal-containing phase and therefore having an undesired influence on the slag properties and causing a so-called freezing or sticking of the metal iron to the internal wall of the reactor.

In accordance with one advancement, it is possible that a hot process gas is conducted from the thermal post-combustion plant into a waste heat recovery plant, wherein the process gas is cooled down and wherein the energy released as a result of the cooling-down is used for generating superheated steam. In this way, the energy from the hot process gas is used in an optimal manner, for example in a combination of power generation and supply of local and remote district heating. In this case, the hot process gas is cooled down and the energy released as a result of the cooling-down is used for generating superheated steam. The waste heat recovery plant comprises the main areas heat recovery boiler and turbine. The heat recovery boiler serves, on the one hand, to cool down the process gas before the waste gas purification and, on the other hand, to generate superheated steam by fitting the boiler with economizer, evaporator and superheater bundles. A large portion of the superheated steam is subsequently converted into electricity using a turbine. In order to supply a local district heating distribution network via heat exchangers, a portion of the steam is diverted via an interim collector. Another interim collector in the turbine enables, moreover, the use of the steam for a remote district heating distribution network.

It may further be expedient if the cooled-down process gas is conducted into a waste gas purification plant. The waste gas purification plant can comprise the main areas process gas purification and hygiene gas purification. In the hygiene gas purification, various extraction points for extracting emissions from the briquetting plant and from the charging plant, from the reactor plant as well as generally from the building extraction system are provided. The diffuse emissions building up in different places with sulfur dioxide-free pollution are supplied to a central hygiene gas filter and dedusted and/or purified there. The process gas purification can be carried out essentially as a three-stage procedure. In this procedure, dusts, i.e. the solids content in the process gas, are separated by filtration in one or multiple dust filters. Additives can also be added. Subsequently, a removal of pollutants takes place, in particular a nitrogen oxide reduction by means of an SCR (selective catalytic reduction) system as well as a reduction of acid components and heavy metals by means of an adsorption process.

It may furthermore be provided that the waste gas purification plant comprises at least one filter for the deposition of solid components from the process gas which has been cooled down to a temperature of preferably 210° C. to 240° C., wherein a deposition of metal dust, in particular of zinc dust, is carried out in the at least one filter. As the metal dust and/or airborne dust is rich in zinc chloride and zinc oxide, hygroscopic additives such as trass powder, for example, can be added as an additive.

Yet, independently of this, the object of the disclosure is also achieved by means of an industrial plant which is provided for carrying out a method according to any one of the claims. The industrial plant comprises a charging plant, a reactor and a thermal post-combustion plant. To avoid unnecessary repetition, reference is made to the above description and advantages.

In accordance with a particular embodiment, it is possible that the industrial plant comprises a waste heat recovery plant and/or a waste gas purification plant.

The present disclosure relates to a method for processing a waste material which contains metal and other substances, in particular if it is in the form of lint or suchlike, for example shredder light fractions, in order to recover the metal.

Against this background, it is one object of the present disclosure to provision a method for processing waste material which contains metal and other substances, in particular if it is in the form of lint or suchlike, for example shredder light fractions, which method is suited for recovering the valuable metals.

This object is achieved by means of the method. Advantageous designs of the disclosure result from the sub-claims.

In such a method for processing waste material containing metal and other substances for recovering the metal, the waste material is compacted into briquettes, subsequently introduced into a melting reactor and melted into at least two phases in the melting reactor.

Generally, the use of melting reactors in which waste material can be melted in order to produce different phases which contain individual raw materials selectively or combined into groups of raw materials is known.

Yet, to operate such melting reactors, it is required to determine and adjust, as precisely as possible, the composition of the reacting material, including air. This was previously impossible for shredder light fractions or similarly structured waste material with a high content of organic and mineral ingredients and a low content of metal ingredients.

The compacting into briquettes initially enables a continuous charging into the melting reactor at a defined charging rate. Moreover, the compacting into briquettes enables the conversion reactions of the waste material in the melting reactor to take place in good and securely controllable conditions. In other words, the compacting into briquettes enables a precise adjustment of the materials introduced into the melting reactor, in particular the mix of materials required for an autothermal reaction, and therefore of the reaction mixture of waste material, pyrolysis gases and air, inside the melting reactor. This ensures, in an efficient and easily controllable manner, the correct proportions of the individual reaction partners to one another, in particular the proportion of waste material to air, in the melting reactor. The method in accordance with the disclosure enables a large portion of the energy contained in the waste material to be used during melting by means of an autothermal melting reaction without having to relinquish the possibility of recovering the metal equally contained in the waste material. This means that it can be recovered in a particularly energy-efficient manner. Further, in addition to recovering the metal, in particular non-ferrous and noble metals, the mineral content optionally contained in the waste material, for example a mineral fraction of shredder light fractions, can be recycled.

The briquettes are preferably produced by compacting the waste material in a press configured as a piston compressor. Such a device, also referred to as a briquetting press, is generally known. In comparison with other options of compacting the waste material, this is possible to do, easily and reliably, even for large quantities and during continuous operation.

Preferably, the metal of the waste material comprises copper, lead, tin, zinc, nickel and iron as well as noble metals. For these metals, the method described herein can be carried out reliably, but also other metals can be recovered in the manner described herein for the recovery from the waste material.

Preferably, the other substances of the waste material comprise organic and/or mineral substances. Particularly, the waste material comprises a high content of organic and mineral ingredients as well as a low content of metal, in particular heavy-metal, ingredients. These kinds of waste material can be processed particularly reliably and advantageously using the method described herein.

Preferably, the briquettes are recycled autothermally in the melting reactor by adding air, so that hot process gases are generated. The compacting of the waste material into briquettes is particularly advantageous here because the briquettes facilitate considerably the continuous and, in terms of its rate, precisely-measured charging of the waste material into the melting reactor over methods which do not introduce the waste material into the melting reactor in another form. This means that the reaction partners can be composed in such a way that no additional energy input is required for the reaction.

The hot process gases generate steam, preferably at least partially in a heat recovery boiler. The steam can be supplied, for example, to a steam turbine for power generation or suchlike. Yet the hot process gases, in particular their thermal energy, can also be used in a different manner, for example in a remote district heating plant.

The hot process gases can further, at least partially, contribute to the waste material being melted in the melting reactor by supplying their thermal energy to the reaction. This means that the hot process gases ensure the melting of the metal and mineral components in the waste material.

Advantageously, a suitable control of the atmosphere in the melting reactor results in a production of a slag phase which is poor in, preferably essentially free from, valuable metal, in particular poor in, preferably essentially free from, copper, lead, tin, zinc, nickel, iron and/or noble metals. The slag phase is deemed poor in valuable metal if it contains 0.7 wt % or less of the valuable metal. The slag phase is deemed essentially free from valuable metal if it contains 0.5 wt % or less of the valuable metal. In addition, a liquid metal phase, in particular a liquid copper phase, is produced, which is enriched with other heavy metals, in particular with lead, tin, zinc, nickel as well as noble metals. The slag phase and enriched liquid copper phase allow a relatively simple selective recovery of the individual ingredients of the waste material. The atmosphere in the melting reactor can be controlled particularly easily, in particular continuously, by supplying the waste material in the form of briquettes.

Preferably, the melted waste material is transferred into a separation furnace, in which a separation, in particular a gravimetric separation, of slag phase and metal phase takes place.

Independent of this, the object is also achieved by means of an industrial plant which is configured for carrying out a method for processing waste material containing metal and other substances for recovering the metal. The industrial plant comprises a press, preferably configured as a piston compressor, for compacting the waste material into briquettes and a melting reactor for melting the briquettes into at least two phases.

Other advantages and advancements of the disclosure result from the entirety of the claims and from the detailed description below.

For the purpose of better understanding of the invention, it will be elucidated in more detail by means of the figures below.

BRIEF DESCRIPTION OF THE DRAWINGS

These show in a respectively very simplified schematic representation:

FIG. 1 is a schematic method flow chart,

FIG. 2. is a detailed view of the reactor plant shown in FIG. 1, and

FIG. 3. is a simplified schematic representation of a system, in which a preferred method can be carried out.

DETAILED DESCRIPTION

First of all, it is to be noted that, in the different embodiments described, equal parts are provided with equal reference numbers and/or equal component designations, where the disclosures filled into in the entire description may be analogously transferred to equal parts with equal reference numbers and/or equal component designations. Moreover, the specifications of location, such as at the top, at the bottom, at the side, chosen in the description refer to the directly described and depicted figure, and in case of a change of position, these specifications of location are to be analogously transferred to the new position.

The term "in particular" shall be understood below to mean that it can be a possible more specified embodiment or narrower specification of an object or of a method step but need not necessarily represent a mandatory, preferred embodiment of same or a mandatory procedure.

In their present use, the terms "comprising," "comprises," "having," "includes," "including," "contains," "containing" and any variations of these shall cover a non-exclusive inclusion.

FIG. 1 shows a grossly schematic method flow chart of the method steps and fluxes of material. It should be understood that not all plant parts and fluxes of material shown and/or described below are mandatorily required. Further, in addition to the plant parts and fluxes of material shown and/or described below, additional ones may be provided.

Essentially, the method shown in FIG. 1 and/or the industrial plant 27 shown there in a grossly schematic manner comprises six main plant areas. These are: a briquetting plant 19, a charging plant 28, a reactor plant 29, a thermal post-combustion plant 14, a waste heat recovery plant 25 as well as a waste gas purification plant 26. Further, a waste preparation plant 48, for example a shredder plant, can be incorporated in the overall plant or precede same. FIG. 2 shows a detailed view of the reactor plant 29. To avoid unnecessary repetition, FIGS. 1 and 2 are described in combination below. The industrial plant 27 can be configured having a central control 30, which enables a monitoring, measurement, control and regulation of individual plant areas. Yet it may also be the case that the main plant areas, or individual plant areas, have a special and/or separate control 30.

In the represented exemplary embodiment, the briquetting plant 19 and the charging plant 28 are configured in an overall plant. The overall plant is essentially fed via a main conveying route for additives 32 and a main conveying route for the waste material 1. In the represented example, the waste material 1 comprising at least one metal 2 and at least one organic material 3 is prepared and/or fractioned in a waste preparation plant 48, so that a separated fraction 4 of the waste material 1 is provisioned. The briquetting plant 19 and the charging plant 28 serve the further preparation of the separated fraction 4, so that, upon leaving the briquetting plant 19 and the charging plant 28, the separated fraction essentially comprises briquettes 5, and optionally a coarse fraction 6 of the waste material 1 or a coarse fraction 6 of another waste material 7. The briquetting plant 19 and the charging plant 28 further serve the transport of the separated fraction 4, i.e. of the briquettes 5 and optionally of the coarse fraction 6, into the subsequent reactor plant 29. Yet it may also be the case that the production of a separated fraction 4, or also merely the production of briquettes 5 from the separated fraction 4, takes place in a structurally, or also spatially, separate briquetting plant 19 and that the briquettes 5 and/or the separated fraction 4 are merely stored in the subsequent charging plant 28 and conveyed to the reactor plant 29 as and when needed.

In the waste preparation plant 48, the waste material 1 is mechanically prepared, in a single or multiple stages, into a separated fraction 4 which comprises at least one metal 2 and at least one organic material 3. The waste material 1 is used to produce briquettes 5 in the briquetting plant 19. Optionally, a coarse fraction 6 of the waste material 1, or a coarse fraction 6 of another and/or additional waste material 7, is further provisioned. A coarse fraction 6 of the waste material 1 may be, for example, a fraction from a shredder presorting process which contains relatively high contents of metals, in particular of non-ferrous heavy metals. A coarse fraction 6 of another waste material 7 may be, for example, electronic scrap, used metal and/or a plastic fraction 31. The separated fraction 4 accordingly comprises the briquettes 5, as well as optionally the coarse fraction 6, and has a calorific value of 5 MJ/kg to 30 MJ/kg and a maximum copper content of 0.1 wt % to 20 wt %. In particular, the separated fraction 4 can have a calorific value of 8 MJ/kg to 25 MJ/kg, preferably of 11 MJ/kg to 18 MJ/kg. Additionally or alternatively, the separated fraction 4 can have a maximum copper content of 0.3 wt % to 10 wt %, in particular of 0.5 wt % to 3 wt %. The briquettes 5 can have a calorific value of 5 MJ/kg to 30 MJ/kg, preferably of 8 MJ/kg to 25 MJ/kg, in particular of 11 MJ/kg to 18 MJ/kg. The briquettes 5 can comprise a fine fraction 17 and/or a lint fraction 18. Further, the briquettes 5 can also comprise a plastic fraction 31.

The structure of a briquetting plant 19 and of a charging plant 28 is generally known and is therefore not described in detail in this context. For example, the briquetting plant 19 and the charging plant 28 can comprise conveyor screws, sieves, surge bunkers, silos, one or multiple briquetting presses, one or multiple containers equipped with load cells, and also conveyor belts. The load cells enable a precisely-dosed charging of the reactor plant 29 and/or the reactor 8 with the briquettes 5 as well as with the coarse fraction 6, and also of any additives 32.

The separated fraction 4 is conveyed into the reactor plant 29 by means of the charging plant 28, wherein the charging of a reactor 8 with the separated fraction 4 is continuous or discontinuous. The reactor 8 can be a melting furnace, in particular a so-called rotary converter or also "Top Blown Rotary Converter" TBRC. Preferably, the reactor 8 is a pear-shaped furnace vessel, which can be rotated about its longitudinal axis and which can be tilted over a tilt point near its circular furnace opening. The reactor 8 consists of a cylindrical sheet steel jacket, Klopper head and top cone and is lined with refractory bricks, for example on a magnesite-chrome basis. The reactor 8 is mounted so as to be rotatable and can execute rotating and tilting movements by means of an electric and/or hydraulic drive.

In the reactor 8, the separated fraction 4 produced from the waste material 1 comprising briquettes 5 and optionally coarse fractions 6 and additives 32 is combusted and/or oxidized and melted, wherein the separated fraction 4 comprises organic material 3 and metal 2, in particular metal iron as well as non-ferrous heavy metals and noble metals. The waste material 1 can also comprise at least one mineral material 15. Alternatively or additionally, a mineral slag former 16 can be added to the separated fraction 4. In particular if the separated fraction 4 has no, or only a low, content of mineral material 15, mineral slag formers 16 can be added to the reactor 8.

Preferably, the reactor 8 is operated in batch operation. To compensate for a cooling-down of the reactor 8 between batches as well as to facilitate a heating-up of the reactor 8 during start-up and/or initial start-up, the reactor 8 is equipped with a natural gas-oxygen burner lance 22. The natural gas-oxygen burner lance 22 is operated by means of natural gas 50 and oxygen 49 and can be water-cooled via a feed pipe for water 51.

The charging materials, i.e. essentially the separated fraction 4, optionally additional additives 32 as well as a gas 9 containing oxygen as an oxidant, are oxidized and/or combusted in the preheated reactor 8 in an incomplete combustion process, wherein the reaction and/or the melting ideally take place autothermally and without additional fuels. The separated fraction 4 is melted into a liquid slag phase 10 and into a liquid metal-containing phase 11 using the thermal energy generated during the combustion of the separated fraction 4. The gas 9 which contains oxygen can be air, in particular ambient air. Yet it may also be oxygen-enriched ambient air.

The reactor 8 is charged with the briquettes 5, with the coarse fraction 6, with any additives 32 such as slag formers 16 and with the gas 9 by means of a charging lance 21. The charging lance 21 can be water-cooled and have a feed pipe for water 51 for that purpose and can be equipped with a bottlebrush-like cleaning system. The briquettes 5 are blown into the reactor 8 with the help of the gas 9. The charging lance 21 can have a diameter which corresponds to two to five-fold the diameter, preferably at least triple the diameter, of the maximum diameter of the separated fraction 4.

A metallurgical consumption lance 23, or also a compressed-air lance 39, is used to introduce compressed air 57 into the reactor 8 as and when needed, wherein the consumption lance 23 can both top-blow directly onto the surface of the separated fraction 4 melted into a slag phase 10 and into a metal-containing phase 11 and be immersed into the two phases 10, 11. The top-blowing of compressed air 57 onto the liquefied surface homogenizes the liquefied surface and has a positive influence on the decomposition of the briquettes 5. When immersing the consumption lance 23 into the two phases 10, 11, the iron contained in the metal-containing phase 11 is partially oxidized. This can prevent too high a content of metal iron in the metal-containing phase 11 from increasing, in an undesired manner, the melting point of the metal-containing phase and therefore having an undesired influence on the slag properties and causing a so-called freezing or sticking of the metal iron to the internal wall of the reactor 8.

In the reactor area, a ceiling crane with lifting units in series can be provided, which can be used for the manipulation of the lances 21, 22, 23 and in repair and standstill phases as well as for clearing out the refractories and for relining the reactor 8.

During the melting of the separated fraction 4, non-ferrous heavy metals and noble metals, in particular the copper, are collected in a metal-containing phase 11 and/or in a copper-iron alloy or black copper phase, which forms below the slag phase 10 due to its higher specific density after the termination of the melting operation and after a specific period of time has elapsed which is required for the gravimetric separation of the phases 10, 11. As soon as a sufficient filling level has been reached in the reactor 8, the introduction of the separated fraction 4, in particular of the briquettes 5, will be terminated. The lances 21, 22, 23 are pulled out of the reactor 8. After the completion of the melting process, the reactor content consists of a metal-containing phase 11 and/or a black copper phase and a slag phase 10, which two phases 10, 11 are jointly transferred, by tilting into a channel system, into a separation furnace 20 for gravimetric separation. Yet it may also be the case—as is, however, not shown in the figures—that the two phases 10, 11 remain in the reactor 8 for gravimetric separation and that, after the separation, the two phases 10, 11 are removed from the reactor 8 separately as a result of their different specific densities. In accordance with the exemplary embodiment shown, the slag phase 10 and the metal-containing phase 11 are placed from the reactor 8 into a separation furnace 20, in which separation furnace 20 a gravimetric separation of the slag phase 10 and of the metal-containing phase 11 takes place. The pouring-off of the slag phase 10 and of the metal-containing phase 11 from the separation furnace 20 takes place separately. Independent of whether the gravimetric separation of the two phases takes place in the reactor 8 or in the separation furnace 20, the pouring-off of the slag phase 10 can take place more frequently than the pouring-off of the metal-containing phase 11.

The separation furnace 20 is preferably a horizontal, cylindrical furnace vessel and/or a so-called drum-type furnace, and is mounted so as to be rotatable about its longitudinal axis across a certain area. Because no autothermal combustion reaction takes place in the separation furnace 20 any longer, the separation furnace 20 can be configured with one or multiple stove burners and/or secondary fuel-natural gas-oxygen burners for avoiding an undesired cooling-down of the phases. Also the feeding channels between the reactor 8 and the separation furnace 20 can be equipped with stove burners and/or secondary fuel-natural gas-oxygen burners for that purpose. As and when needed, additives 32 can be added to the two phases 10, 11, should a correction of the slag composition, in particular in terms of its viscosity, be required. The separation furnace 20 comprises an opening for pouring off the slag phase 10 in a direction of a slag granulation (slag spout) and an opening for draining the metal-containing phase 11 and/or the black copper in a direction of an ingot casting belt (metal spout).

The subsequent process steps of the slag granulation and/or of the processing of the metal-containing phase 11 on the ingot casting belt are not described in more detail in this context as they are well-known by those working in the field.

Due to the high calorific value of the separated fraction 4 and/or in particular the briquettes 5, a process control with an incomplete combustion and/or oxidation is of importance, so that the reactor 8 is protected against overheating and/or against a thermal collapse and associated damage. It has become apparent that an incomplete combustion is sufficient for melting the separated fraction 4 into the two phases 10, 11. In the course of the melting process, the separated fraction 4 is melted at a temperature of about 1220° C. to 1250° C. In particular, merely one portion of the combustion energy is used for melting the separated fraction 4. This results in an incompletely combusted flue gas 13 and/or in a non-combusted pyrolysis process gas with a high CO content in the reactor 8. At least one portion 12 of this incompletely combusted flue gas 13 is conducted out of the reactor 8 and into a thermal post-combustion plant 14, in which a single or multi-stage post-combustion of the at least one portion of the 12 incompletely combusted flue gas 13 takes place.

A preferably continuous, measurement of the oxygen content, of the composition and/or of the temperature of the at least one portion 12 of the incompletely combusted flue gas 13 can take place. On the basis of the measurement, a proportion of a charging quantity of briquettes 5 and/or of a coarse fraction 6 to a quantity of the gas 9 can be controlled by means of the control 30.

Yet it is also possible that a, preferably continuous, measurement of the oxygen content, of the composition and/or of the temperature of the at least one portion 12 of the incompletely combusted flue gas 13 takes place. On the basis of the measurement, the calorific value of the briquettes 5 in an upstream briquetting plant 19 can be controlled by means of the control 30.

The post-combustion of the incompletely combusted flue gas 13 and/or the high-calorific dust-polluted process gas in the thermal post-combustion plant 14 is necessary and legally required in many countries. The thermal post-combustion plant 14 essentially comprises a post-combustion boiler. This often demands a post-combustion at a temperature of 1100° C. with a residence time of at least two seconds after the last fresh air supply. This pyrometallurgical process can take place in a cyclical manner, wherein a batch period is about the same duration as a melting cycle in the reactor 8. This kind of the process control results in an equally cyclical quantity of heat from the reactor 8 which must be compensated for by adding secondary or substitute fuels to the post-combustion boiler in order to be able to ensure a stable operation of a waste heat recovery plant 25 subsequent to the thermal post-combustion plant 14.

The process gases from the reactor plant 29 and/or from the reactor 8 are captured by a waste gas hood. In this process, a vacuum-dependent quantity of air and/or ambient air is mixed into the process gas 24 and results, there, in a beginning partial combustion of the combustible components (CO, H2, CxHy) of the process gas 24. The temperature of the process gas 24 can rise to approximately 1450° C. in the subsequent short process gas channel to the boiler. The necessary combustion air and the substitute fuels are supplied at the post-combustion boiler inlet as and when needed. For safety reasons, a controllable natural gas burner can run permanently at minimum power as a pilot burner for ensuring a safe ignition of the process gas. One section of the combustion chamber of the post-combustion boiler is lined with refractory material and configured for observing a residence time of two seconds and a temperature of 1100° C. after the last fresh air supply. Preferably two combustion air diffusers with nozzles are provided for blowing combustion air into the post-combustion chamber. The nozzle system is integrated in the combustion air diffusers, which nozzle system can be used to combust waste oil, methanol-water mixture, acetone or natural gas. The control of the substitute fuels is controlled depending on the necessary temperature in the post-combustion line of the thermal post-combustion plant 14. Another section of the combustion chamber of the post-combustion boiler is configured as a deflection and arranged immediately behind the preceding section of the post-combustion chamber.

The deflection section itself can be subdivided into two sections, in which the cross-section changes. In the lower area, directly at the connection point with the chimney, the deflection is configured round in section. At the transition, the cross-section changes from round to square. This enables the deflection to be connected with the first flue of the boiler system, which has a square cross-section. The tube wall of the deflection is configured so as to observe a residence time of two seconds at 1100° C. after the last fresh air supply.

The hot process gas 24 generated in the thermal post-combustion plant 14 in the course of the post-combustion can be conducted into a waste heat recovery plant 25, so that the energy from the hot process gas 24 can be used in an optimal manner, for example in a combination of power generation and supply of local and remote district heating. In this case, the hot process gas 24 is cooled down and the energy released as a result of the cooling-down is used for generating superheated steam. The waste heat recovery plant 25 comprises the main areas heat recovery boiler and turbine. The heat recovery boiler serves, on the one hand, to cool down the process gas before the waste gas purification and, on the other hand, to generate superheated steam by fitting the boiler with economizer, evaporator and superheater bundles. A large portion of the superheated steam is subsequently converted into electricity using a turbine. In order to supply a local district heating distribution network via heat exchangers, a portion of the steam is diverted via an interim collector. Another interim collector in the turbine enables, moreover, the use of the steam for a remote district heating distribution network.

The cooled-down process gas 24 can subsequently be conducted into a waste gas purification plant 26. The waste gas purification plant 26 comprises the main areas process gas purification and hygiene gas purification. In the hygiene gas purification, various extraction points for extracting emissions from the briquetting plant 19 and from the charging plant 28, from the reactor plant 29 as well as generally from the building extraction system are provided. The diffuse emissions building up in different places with sulfur dioxide-free pollution are supplied to a central hygiene gas filter and dedusted and/or purified there. The process gas purification can be carried out essentially as a three-stage procedure. In this procedure, dusts, i.e. the solids content in the process gas 24, are separated by filtration in one or multiple dust filters and optionally by adding additives. Subsequently, a removal of pollutants takes place, in particular a nitrogen oxide reduction by means of an SCR (selective catalytic reduction) system as well as a reduction of acid components and heavy metals by means of an adsorption process. The waste gas purification plant 26 can comprise at least one filter for the deposition of solid components from the process gas 24 which has been cooled down to a temperature of 210° C. to 240° C., wherein a deposition of metal dust, in particular of zinc dust, is carried out in the in the at least one filter. As the metal dust and/or air-borne dust is rich in zinc chloride and zinc oxide, hygroscopic additives such as trass powder, for example, can be added as an additive 32.

FIG. 3 shows another simplified schematic representation of a system, in which a preferred method can be carried out. It is shown there in an overall process and/or in an overall plant how briquettes 1 produced in accordance with the method are used and/or prepared in a reactor plant 29.

Shredder light fractions as a present example of a waste material 1 containing metal 2 and other substances, whose metal content is to be essentially recovered, are initially introduced into a stock bunker 33 in order to be processed further from there. From the stock bunker 33, the waste material 1 is supplied, via conveyor screws 34 and suchlike, to a briquetting press configured as a piston compressor 35, where the waste material is compacted 1 into briquettes 5. In terms of metal 2, the shredder light fractions can contain, in particular, copper, lead, tin, zinc, nickel and/or noble metals.

In a specific plant, for example four briquetting presses configured as piston compressors 35 can compact and briquet about 10 tons of shredder light fractions per hour.

The briquettes 5 are subsequently transported, via a scale 36, into a dosing bunker 37 in order to be introduced, from there, into a melting reactor 38 via a charging lance 21. In addition to the briquettes 5, also air 47 is introduced into the melting reactor 38 in order to generate a reactive mixture inside the melting reactor 38. The introduction of the briquettes 5 takes place batchwise, i.e. in stages.

Before the briquettes 5 are introduced into the melting reactor 38, the melting reactor 38 is heated up, for example to 1200° C. to 1250° C. By compacting the waste material 1 into briquettes 1, it can be adjusted with great precision how much organic material 3 is introduced into the interior of the melting reactor 38. To that end, for example a content of 35% to 50% organic material 3 of the introduced mass has proven successful for an autothermal reaction with the participation of the air 47 and pyrolysis gases supplied via a separate compressed-air lance 39.

The autothermal reaction can be stabilized by controlling the quantity of supplied air and pyrolysis gases, wherein it is of essential importance, to that end, to know how much organic material 3 participating in the reaction is located in the melting reactor 38. Only as much air 47 as is needed for the reaction to take place in the melting reactor 38, i.e. for the organic material 3 and the pyrolysis gases to burn, is supplied. The supply of air 47, however, is limited in order not to have all pyrolysis gases directly combust and not to overheat the melting reactor 38. This reaction can proceed in the melting reactor 38, for example over 5 to 5.5 hours, without external firing, and a bath of liquid slag 10 and liquid metal 11 will form in the interior of the melting reactor 38 in this manner.

Hot process gases 24 are generated during the autothermal reaction, which hot process gases 24 are extracted via an extraction hood 40 and supplied to a boiler 42 via a post-combustion chamber 41, in which boiler 42 steam can be generated in the usual manner, which steam can be used for generating electric energy via a turbine 43. The steam can alternatively and additionally be used in local and remote district heating distribution networks.

After the reaction in the melting reactor 38 has proceeded as completely as possible, the melting reactor 38 can be poured out and its liquid content conveyed further via a transport line 44. Preferably, the bath of liquid slag 10 and liquid metal 11 is therefore supplied to a separation furnace 20, which separation furnace 20 can be realized, for example, as a drum-type furnace, and which can have an internal temperature of, for example, 1200° C. to 1250° C. As opposed to the melting reactor 38, the separation furnace 20 is fired externally in order to reach and maintain its temperature, as no reaction is to take place inside it any longer. After the melting reactor 38 has been emptied, it can be filled with another charge of waste material 1.

In the separation furnace 20, a separation of the slag phase 10 from the metal phase 11 can take place over a time span of, for example, equally 5 to 5.5 hours. Gravimetric separation is favorable to that end, as the slag phase 10 has a density of about 3 t/m³ to 3.5 t/m³, while the metal phase 11 has a density of about 8 t/m³, wherein these values are only exemplary and will change from material to material, of course. In case of different densities of the two or more phases, the two or more phases will isolate from one another in layers in the separation furnace 20.

In the separation furnace 20, an adjusting of the slag can take place over a time span of, for example, 3 hours to 4 hours, and the slag can then be granulated over a time span of, for example, 2 hours to 3 hours, and be removed from the separation furnace 20 via a slag output line 45.

Preferably subsequently, the metal 2 can be removed from the separation furnace 20 via a metal output line 46 and therefore recovered. The metal 2 can be, for example, in the form of a liquid metal phase 11, for example copper phase, which can be enriched with other metals or heavy metals such as lead, tin, zinc, nickel and/or noble metals.

The exemplary embodiments show possible embodiment variants, wherein it should be noted in this respect that the invention is not restricted to these particular illustrated embodiment variants of it, but that rather also various combinations of the individual embodiment variants are possible and that this possibility of variation owing to the teaching for technical action provided by the present disclosure lies within the ability of the person skilled in the art in this technical field.

The scope of protection is determined by the claims. However, the description and the drawings are to be adduced for construing the claims. Individual features or feature combinations from the different exemplary embodiments shown and described may represent independent inventive solutions. The object underlying the independent inventive solutions may be gathered from the description.

Any and all specifications of value ranges in the description at issue are to be understood to comprise any and all sub-ranges of same, for example the specification 1 to 10 is to be understood to mean that any and all sub-ranges starting from the lower limit 1 and from the upper limit 10 are comprised therein, i.e. any and all sub-ranges start at a lower limit of 1 or larger and end at an upper limit of 10 or less, e.g. 1 to 1.7, or 3.2 to 8.1, or 5.5 to 10.

Finally, as a matter of form, it should be noted that for ease of understanding of the structure, elements are partially not depicted to scale and/or are enlarged and/or are reduced in size.

LIST OF REFERENCE NUMBERS 1 waste material
2 metal
3 organic material
4 separated fraction
5 briquette
6 coarse fraction
7 other waste material
8 reactor
9 gas containing oxygen
10 slag phase
11 metal-containing phase
12 portion
13 incompletely combusted flue gas
14 thermal post-combustion plant
15 mineral material
16 mineral slag former
17 fine fraction
18 lint fraction
19 briquetting plant
20 separation furnace
21 charging lance
22 natural gas-oxygen burner lance
23 consumption lance
24 process gas
25 waste heat recovery plant
26 waste gas purification plant
27 industrial plant
28 charging plant
29 reactor plant
30 control
31 plastic fraction
32 additive
33 stock bunker
34 conveyor screw
35 piston compressor
36 scale
37 dosing bunker
38 melting reactor
39 compressed-air lance
40 extraction hood
41 post-combustion chamber
42 boiler
43 turbine
44 transport line
45 slag output line
46 metal output line
47 air
48 waste preparation plant
49 oxygen
50 natural gas
51 water
52 wastewater
53 remote district heating distribution network
54 local district heating distribution network
55 dusts
56 exhaust air
57 compressed air

The invention claimed is:

1. A method for separating a waste material, the waste material comprising at least one metal and at least one organic material, the method comprising the steps:
provisioning a separated fraction of the waste material,
which separated fraction is isolated from the waste material in the course of a mechanical preparation operation and which comprises the at least one metal and the at least one organic material,
which separated fraction essentially comprises briquettes produced from the waste material, and optionally a coarse fraction of the waste material or a coarse fraction of another waste material, and which separated fraction has a calorific value of 5 MJ/kg to 30 MJ/kg and a maximum copper content of 0.1 wt % to 20 wt %, charging of a reactor with the separated fraction, introducing gas containing oxygen into the reactor as an oxidant and combusting the separated fraction in a combustion process, melting the separated fraction into at least one liquid slag phase and into at least one liquid metal-containing phase using a thermal energy generated during the combustion of the separated fraction, pouring off the at least one slag phase and/or the at least one metal-containing phase from the reactor, and conducting at least one portion of a combusted flue gas out of the reactor, conducting the at least one portion of the combusted flue gas into a thermal post-combustion plant and post-combusting the at least one portion of the combusted flue gas.

2. The method according to claim 1, wherein the waste material comprises at least one mineral material and/or a mineral slag former is added to the separated fraction.

3. The method according to claim 1, wherein the separated fraction is provisioned with a calorific value of 8 MJ/kg to 25 MJ/kg.

4. The method according to claim 1, wherein the separated fraction is provisioned with a copper content of 0.3 wt % to 10 wt %.

5. The method according to claim 1 any one of the preceding claims, wherein characterized in that the briquettes are provisioned with a calorific value of 5 MJ/kg to 30 MJ/kg.

6. The method according to claim 1 any one of the preceding claims, wherein characterized in that the briquettes are provisioned comprising a fine fraction and/or a lint fraction.

7. The method according to claim 1 any one of the preceding claims, wherein characterized in that the gas is air.

8. A method for separating a waste material, the waste material comprising at least one metal and at least one organic material, the method comprising the steps:

provisioning a separated fraction of the waste material, which separated fraction comprises briquettes produced from the waste material, and which separated fraction has a calorific value of 5 MJ/kg to 30 MJ/kg and a copper content of 0.1 wt % to 20 wt %, charging of a reactor with the separated fraction, introducing gas into the reactor as an oxidant and combusting the separated fraction, melting the separated fraction into at least one liquid slag phase and into at least one liquid metal-containing phase using a thermal energy generated during the combustion of the separated fraction, pouring off the at least one slag phase and/or the at least one metal-containing phase from the reactor, conducting at least one portion of a combusted flue gas out of the reactor, conducting the at least one portion of the combusted flue gas into a thermal post-combustion plant and post-combusting the at least one portion of the combusted flue gas.

9. The method according to claim 8 wherein a continuous measurement of the oxygen content, of a composition and/or of a temperature of the at least one portion of the combusted flue gas takes place and that a calorific value of the briquettes in an upstream briquetting plant is controlled on the basis of the measurement.

10. The method according to claim 8 wherein the at least one metal-containing phase is a copper-iron alloy.

11. The method according to claim 8 wherein the at least one slag phase and the at least one metal-containing phase are placed from the reactor into a separation furnace, in which a gravimetric separation of the at least one slag phase and of the at least one metal-containing phase takes place, and that the pouring-off of the at least one slag phase and of the at least one metal-containing phase from the separation furnace takes place separately.

12. The method according to claim 8, wherein the pouring-off of the at least one slag phase takes place more frequently than the pouring-off of the at least one metal-containing phase.

13. The method according to claim 8 wherein the reactor is charged with the briquettes with a coarse fraction and with the gas by means of a charging lance and that the charging lance has a diameter which corresponds to two to five-fold the diameter of the maximum diameter of the separated fraction.

14. The method according to claim 8 any one of the preceding claims, wherein characterized in that a natural gas-oxygen burner lance is provisioned, which protrudes into the reactor and which is used for firing the reactor during a start-up process.

15. The method according to claim 8 wherein a metallurgical consumption lance is provisioned, which protrudes into the reactor and which is used for injecting gas containing oxygen into the reactor, wherein the gas is either top-blown directly onto the separated fraction or wherein the consumption lance is immersed in the separated fraction.

16. The method according to claim 8 wherein a hot process gas is conducted from the thermal post combustion plant into a waste heat recovery plant, wherein the process gas is cooled down and wherein the energy released as a result of the cooling-down is used for generating superheated steam.

17. The method according to claim 16, characterized in that wherein the cooled-down process gas is conducted into a waste gas purification plant.

18. The method according to claim 17, wherein the waste gas purification plant comprises at least one filter for the deposition of solid components from the cooled-down process gas, wherein a deposition of metal dust, in particular of zinc dust, is carried out in the at least one filter.

19. A method for separating a waste material, the waste material comprising at least one metal and at least one organic material, the method comprising the steps of:

provisioning a separated fraction of the waste material, which separated fraction is isolated from the waste material, which separated fraction comprises briquettes produced from the waste material, and which separated fraction has a calorific value of 5 MJ/kg to 30 MJ/kg and a copper content of 0.1 wt % to 20 wt %, charging of a reactor with the separated fraction, introducing gas into the reactor and combusting the separated fraction, melting the separated fraction into at least one liquid slag phase and into at least one liquid metal-containing phase, pouring off the at least one slag phase and/or the at least one metal-containing phase from the reactor, conducting at least one portion of a combusted flue gas out of the reactor, and post-combusting the at least one portion of the combusted flue-gas.

20. The method as claimed in claim 19, further providing a waste heat recovery plant and/or a waste gas purification plant.

* * * * *